United States Patent [19]

Carver

[11] 4,003,154
[45] Jan. 18, 1977

[54] FISHING LURE

[76] Inventor: Robert G. Carver, P.O. Box 44, Athens, La. 71003

[22] Filed: Aug. 25, 1975

[21] Appl. No.: 607,106

[52] U.S. Cl. .............................. 43/42.13; 43/42.09
[51] Int. Cl.² ........................................ A01K 85/00
[58] Field of Search .......... 43/42.13, 42.11, 42.74, 43/43.1, 43.13, 42.09

[56] References Cited

UNITED STATES PATENTS

| 2,266,234 | 12/1941 | Mitchell | 43/42.13 |
| 3,143,824 | 8/1964 | Thomas | 43/42.11 |

FOREIGN PATENTS OR APPLICATIONS

| 17,700 | 1909 | United Kingdom | 43/42.74 |

Primary Examiner—G. E. McNeill
Assistant Examiner—Daniel J. Leach
Attorney, Agent, or Firm—John M. Harrison

[57] ABSTRACT

A fishing lure of spinner design which consists of a lead body with a hook molded therein, and a wire harness fitted with a loop for attaching a line, one end of which harness is molded into the lead body of the lure and the other end of which carries a dual spinner system. The spinner combination is carried by two legs of a triangular swivel, the third leg being attached to the wire harness.

16 Claims, 9 Drawing Figures

U.S. Patent
Jan. 18, 1977
4,003,154
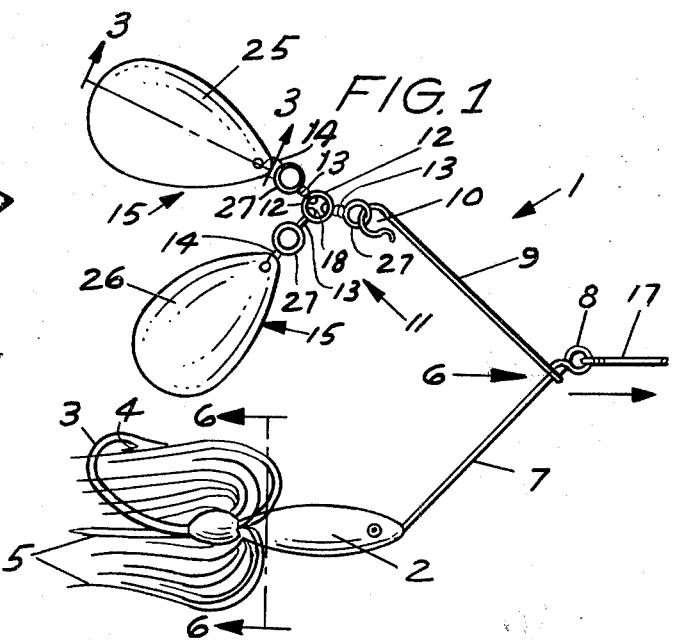
FIG. 1
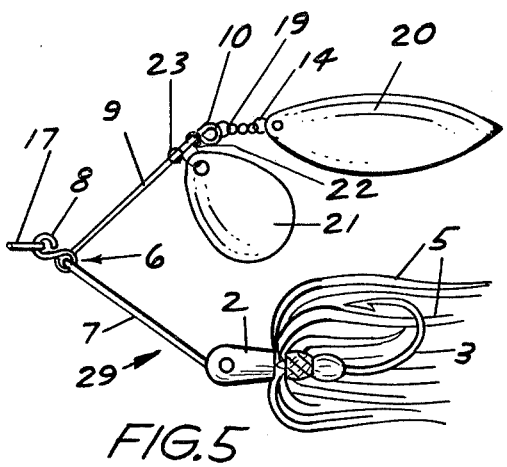
FIG. 5
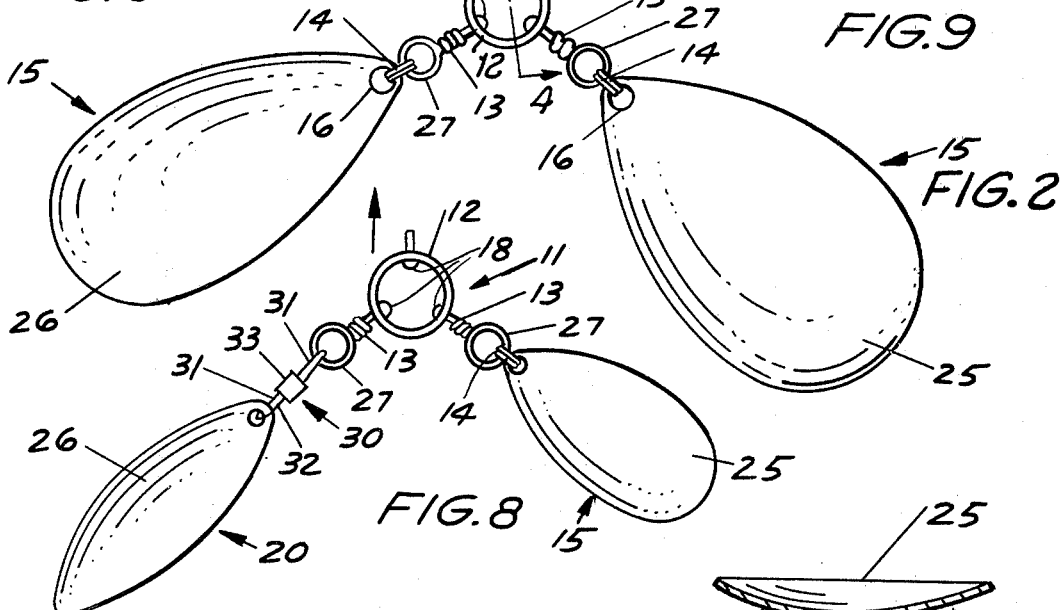
FIG. 6
FIG. 2
FIG. 9
FIG. 8
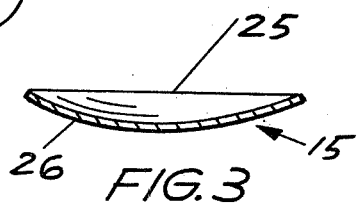
FIG. 3
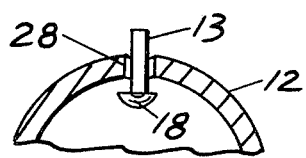
FIG. 7
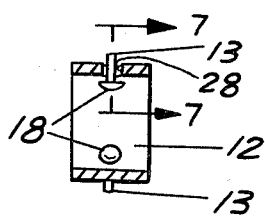
FIG. 4

FISHING LURE

BACKGROUND OF THE INVENTION

1. Field of the Invention

This invention relates to fishing lures, and more particularly, to fishing lures of the spinner design commonly known as "spinner baits", which are among the oldest fishing lures known to modern man. The effectiveness of such lures in taking fish depends upon the flashing effect of one or more "spinners"to or "blades" rotating on a wire swivel as the bait is retrieved and is caused to simulate a swimming action through the water.

2. Description of the Prior Art

In recent years the sport of fishing has been transformed into a much pursued big business, with millions of dollars spent annually on boats, fishing tackle and lures. With the increased emphasis on taking such popular game fish as black bass, has come an explosion in the development and marketing of improved fishing tackle, and new baits and lures in particular. Perhaps the most effective of all lures, particularly in taking the highly respected black bass, is the spinner bait, which commonly accounts for a large percentage of all game fish caught each year.

Conventional spinner baits typically consist of a lead body having a hook molded therein, the barb of the hook generally being turned upwardly to minimize snagging on underwater obstacles as the lure is retrieved. A wire harness is also provided, with a spinner attached to one end thereof, generally in an "offset" manner, the opposite end of the wire harness generally being molded into the body of the lure. The offset wire harness is typically of the "safety pin" design, wherein the leg which is attached to the lure body extends forward and upwardly from the body at approximately a 45° angle where a loop is fashioned in the harness at a selected distance from the body for attaching a fishing line. After the loop is formed, generally by bending and twisting the harness, a second leg or portion of the harness is typically caused to extend rearwardly and upwardly, again at approximately a 45° angle with the horizontal, to a point above, and spaced from the body of the lure, where a second loop is formed. A swivel is typically attached to this second loop or spinner eye, and a spinner blade is fitted to the swivel. The swivel is generally used to facilitate smooth rotation of the blade through the water during retrieval. Various attachments can be used with the lure, most of which are designed to be positioned in removable fashion to the lure body, such as skirts, pork rind, and other trailers, including plastic worms, and the like, as well as selected other contrivances designed to make the lure appear more life-like and aid in attracting the attention of fish. The swivel and spinner combination fitted to the wire loop directly above the body facilitates spinner rotation and oscillation as the lure is pulled through the water, thereby providing a primary attraction to the fish.

Spinner baits and lures seem to be particularly effective in taking fish because of the dual attraction of a rotating spinner or spinners, which may be painted in a variety of colors or polished to a high sheen, and the skirt and/or trailer attached to the hook portion of the bait. Accordingly, these lures have enjoyed much success in practical application, and this success has resulted in great commercial significance.

Many anglers believe that the predominant reason for the success of the spinner-type lure is the spinner or spinners themselves, since this seems to be the primary feature which attracts the fish to the lure. Consequently, many different designs have been proposed, both as to the shape and size of the spinners, and also to the technique for mounting the spinners on the wire harness. As heretofore noted, the most commonly accepted and used technique for mounting the spinners is by means of a swivel, which permits the spinner to oscillate and rotate, depending upon the speed of retrieval, without materially affecting the "swimming" position of the lure in the water.

Particular spinner design and shape has included the common "teardrop" spinner which, as its name implies, is shaped in the form of a slightly concave teardrop, the concave shape being important in order to effect proper spinning and rotation of the spinner about its axis. Another popular shape is the "willow leaf" spinner which is long in relationship to its width, and which is also characterized by a slightly concave shape to impart the spinning characteristic while the lure is retrieved. A common spinner color is silver, with the surface of the spinner normally highly polished to provide a reflection of the sun's rays as the spinner rotates through the water, in order to attract fish. Apparently such spinners resemble small shad and other fish upon which game fish, such as bass, feed, thereby effecting the desired attraction. Spinners may also be colored to simulate the colors of other game fish such as small bream, and in recent times, it has been found that orange and black, as well as yellow spinners, are desirable and effective in catching fish.

While it is common to use a spinner bait having the design discussed above with a single spinner attached by means of a swivel to the wire harness, another popular arrangement is the dual spinner tandem design. In this arrangement two spinners are normally used, one of which is typically attached to the wire harness by means of a swivel as heretofore discussed, and the other being mounted forward of the wire loop and first spinner on the wire harness itself. When retrieved, the first spinner rotates on its axis behind the wire loop and the second rotates on an axis around the harness forward of the loop, both spinners rotating in tandem. A disadvantage commonly realized in such an arrangement is that one or both spinners frequently fail to rotate smoothly, thereby causing an undesirable fluttering action in the lure. Furthermore, the effectiveness of two spinners spinning in tandem, as compared to a single spinner is somewhat subject to question since it is doubtful whether the second spinner really adds much, if anything, to the appearance of the lure.

Control of lure vibration, color and spinner blade action is very important to the angler since it is known that fish will take a lure under particular circumstances of lure presentation depending upon many factors, such as water clarity, depth and temperature, weather conditions, and the like. Accordingly, the lure which is capable of responding to the angler's manipulation of rod and reel with great versatility of action will consistently take fish.

Accordingly, it is an object of this invention to provide a new and improved fishing lure of the "spinner bait" design having a non-tandem, dual spinner system.

Another object of this invention is to provide a spinning-type lure which utilizes a pair of spinners and a triangular swivel instead of a single or tandem double spinner design, as in conventional spinner baits.

Yet another object of this invention is to provide a new and improved spinner bait having two spinner blades mounted on a triangular swivel in non-tandem arrangement to provide a wider variety of spinner action and effecting an accompanying increase in fish attraction than is possible with conventional designs.

A still further object of the invention is to provide a new and improved spinning lure characterized by a dual spinner system consisting of a pair of spinners attached to a triangular shaped swivel, which spinners may be of different colors or the same color, and of either different or the same shape, size, and/or design, as desired.

Yet another object of the invention is to provide a new and improved spinning lure having a pair of spinners attached to two legs of a triangular swivel, the third leg of which is carried by a wire harness, which is itself carried by the bait body.

Yet another object of the invention is to provide a spinning lure having a triangle swivel carrying two spinner blades, each of which may be of selected size, shape and color to vary the degree of vibration desired for a selected speed and type of retrieval.

A still further object of the invention is to provide a new and improved spinner lure having a pair of blades attached to a triangular swivel in which the following illustrative, but not inclusive spinner motions can be achieved; the top spinner can be made to "surfboard" while the bottom spinner oscillates below it; both spinners may be made to oscillate in parallel plains; one spinner may be made to "surfboard" and the other spinner to rotate on its axis of spin; both spinners can be caused to rotate on their respective axis of spin while the whole spinner system rotates; the bottom spinner can be made to "surfboard" while the top spinner oscillates above it; and other combinations of spinner motion can be effected by varying the retrieve technique.

A still further object of the invention is to provide a dual spinner system for spinner baits and lures wherein a triangular shaped swivel is used to carry a pair of spinner blades of selected similar or dissimilar size, shape, color and distance between each respective spinner and the common swivel to achieve a variation in lure vibration and presentation during retrieval.

SUMMARY OF THE INVENTION

These and other objects of the invention are provided in a fishing lure of the spinning and offset harness ("safety pin") design, which lure consists of a body and an offset harness, one end of which is carried by the body and the other end of which carries a dual spinner system in which each of two spinners is attached to a separate leg of a triangular shaped swivel, the third leg of the swivel being attached to the offset end of the harness.

BRIEF DESCRIPTION OF THE DRAWINGS

The invention will be better understood in view of the following description presented with reference to the accompanying drawings:

FIG. 1 of the drawings is a side elevation of a typical improved spinner bait of this invention;

FIG. 2 is a side elevation of a typical new and improved spinner system of the lure illustrated in FIG. 1, showing a typical spinner relationship;

FIG. 3 is a sectional view of a typical spinner blade in the spinner system of the lure illustrated in FIGS. 1 and 2, taken along lines 3—3 in FIG. 1, showing a typical cross-sectional configuration;

FIG. 4 is a cross-sectional view of the triangular swivel of the spinner system illustrated in FIGS. 1 and 2, taken along lines 4—4 in FIG. 2, showing the internal configuration of the swivel;

FIG. 5 is a side elevation of a conventional tandem mounted spinner bait known in the art;

FIG. 6 is a cross-sectional view of the lure body taken along lines 6—6 in FIG. 1;

FIG. 7 is a cross-sectional view of the triangular swivel along lines 7—7 in FIG. 4;

FIG. 8 is a side elevation of an alternative configuration of the improved spinner system of this invention; and FIG. 9 is a side elevation of the quick release coupling illustrated in FIG. 8.

DESCRIPTION OF THE PREFERRED EMBODIMENTS

Referring now to FIG. 1 of the drawing, the spinner bait of this invention is generally illustrated by reference numeral 1, consisting of body 2, which is normally formed of molded lead. Hook 3, fitted with barb 4 and wire harness 6, the first portion 7, of which is typically embedded in body 2 during the molding process, are also formed as illustrated. Spinner lures of this design are generally manufactured by initially placing hook 3 and wire harness 6 in an appropriate mold and pouring melted lead into the mold to form body 2, with hook 3 and wire harness 6 integrally formed therein. Wire harness 6 is typically fashioned of a single piece of wire with first portion 7 being disposed upwardly at a selected angle with respect to the horizontal from its point of contact with body 2. Harness eye 8 is then formed in wire harness 6, and a second portion 9, of wire harness 6 is subsequently formed and also disposed rearwardly at a selected angle with respect to first portion 7 above body 2. Spinner eye 10 is then formed at the end of second portion 9, preferably in the configuration as illustrated in FIG. 1 to permit easy insertion and removal of the spinner system.

Referring now to FIGS. 1 and 5 of the drawing, it will be appreciated that the design of the spinner bait body and harness of this invention as illustrated in FIG. 1 is generally typical of conventional lure 29, illustrated in FIG. 5. However, the conventional tandem spinner arrangement illustrated in FIG. 5, with tandem spinner 21 mounted on tandem spinner rotator 22, the latter of which is rotatably carried by second portion 9 of wire harness 6, is considerably different from the spinner system of this invention. Rotator 22 and willow leaf spinner 20 serve to help stabilize conventional lure 29 and effectuate a smooth and stable bait retrieve. Spinner eye 10 carries conventional swivel 19, to which is rotatably attached willow leaf spinner 20 by means of ring connector 14. Accordingly, retrieval of conventional lure 29 effects a rotation of tandem spinner 21 on an axis around second portion 9 of wire harness 6, while willow leaf spinner 20 rotates on its axis behind spinner eye 10, in trailing fashion. Rotation of the spinners is effected by water pressure against the convex and concave spinner surfaces, as is more fully disclosed hereinafter.

In contrast to the conventional design illustrated in FIG. 5, the spinner arrangement of this invention as more particularly illustrated in FIG. 2 of the drawing consists of a pair of spinners 15 of essentially identical size attached by means of ring connectors 14 to swivel eyes 27 of triangle swivel 11. It will be appreciated that triangle swivel 11 is equipped with three swivel eyes 27, carried by swivel legs 13, in cooperation with and carried by ring 12, two of which swivel eyes carry spinners 15, and the third of which is attached to spinner eye 10, fashioned at the end of second portion 9 of wire harness 6, as illustrated in FIG. 1. Swivel eye stops 18 serve to prevent swivel legs 13 from exiting ring aperture 28, as illustrated in FIGS. 4 and 7 of the drawing. Accordingly, the retrieval action of spinners 15 in this system is in marked contrast to the action of willow leaf spinner 20 and tandem spinner 21, illustrated in FIG. 5 of the drawing, because of the close proximity of spinners 15 to each other, and because of the particular mounting system of spinners 15 on triangle swivel 11. For example, it will be appreciated that as spinner bait 1 is being retrieved through the water in the direction indicated by the arrow, depending upon the speed of retrieval, spinners 15 will move on different axes and in different relationships with respect to each other. At one particular speed, for example, spinners 15 may be caused to oscillate in essentially parallel plains on triangle swivel 11 to give the appearance of an injured fish swimming relatively slowly through the water. This image is enhanced in many cases depending upon the clarity and color of the water, by providing different colored spinners 15; typically, one spinner might be painted orange, while the other spinner is painted black to resemble the flashing of a bream to and fro in the water.

In like manner, referring again to FIG. 2 of the drawing, if the lure is retrieved more rapidly in the direction of the arrow, spinners 15 may be caused to rotate on their individual axis of spin and present an even more flashing image as they travel through the water at a more rapid rate. This action simulates the movement of a small fish such as a bream, moving rapidly in the water as if escaping a predator fish. Again, the relative colors of spinners 15 may be utilized to simulate a particular fish upon which the bass or other game fish sought typically feed. Still another possible spinner action may be achieved by retrieving the spinner bait at a particular selected speed in which spinners 15 orient themselves one above the other in their travel through the water, and one spinner is caused to oscillate while the other "surfboards", with very little oscillating or rotating action. This action of spinners 15 creates an unique effect, particularly in the case where the spinners are of different colors, since the oscillating spinner is constantly moving over and then withdrawing from at least a portion of the surface area of the spinner which is "surfboarding", to achieve an unusual flashing effect of color. This action again seems to simulate the movement and activity of feed fish, and can be used effectively to lure game fish.

It will be appreciated that spinner blades 15 illustrated in FIG. 2 of the drawing are each the same size, typically Colorado number 5 blades, and this arrangement causes a harmonic rotational action which produces a specific vibration at any given retrieval speed sufficiently rapid to effect full spinning of both blades. If one of blades 15 were exchanged for a smaller or larger spinner, or a spinner having a different shape, a different set of vibrations can be realized by again varying the lure retrieval speed.

In like manner, referring now to FIG. 8 of the drawing, a willow leaf spinner 20 is substituted for the Colorado blade, and in addition, is extended from swivel eye 27 of triangle swivel 11 by means of quick-release coupling 30. Quick-release coupling 30 is designed to permit a quick exchange of blade 20 or release from swivel eye 27 by simply sliding coupling slide 33 either upwardly or downwardly on coupling legs 31 and coupling shank 32 to provide access to either one of coupling eyes 34, as more particularly illustrated in FIG. 9. The effect of extending willow leaf spinner 20 from swivel eye 27 further than the distance between spinner 15 and its companion swivel eye 27 is to create a still more pronounced lure vibration which varies in intensity with the retrieval speed of the bait. Just as the presence of spinner blades having dissimilar shapes and/or sizes and mounted on triangle swivel 11 effects an interruption of the harmonic motion created by similar blades during retrieval, increasing the blade-to-swivel eye distance of one spinner blade also disrupts the harmonic rotation and effects an even more pronounced vibration. This spinner system creates a "tunnelling" effect which causes extensive vortices in the water behind the lure, and combines with vibration and lure appearance to aid in attracting fish.

Accordingly, it will be appreciated that the degree of vibration of the lure of this invention can be selected and controlled by such exemplary techniques as selection of the size, shape and design of the spinner blades, the retrieval speed of the lure, and by varying the distance between a spinner and its carrying swivel eye by means of a quick-release coupling, as well as by use of additional ring connectors or other mechanical means such as swivels to extend this distance. Vibration can also be increased by adding a second harness shaped essentially as the first and spaced from it, and providing a second spinner system for this harness. This design greatly increases both lure vibration and vortex action with accompanying attractiveness to the fish.

Referring now to FIG. 3 of the drawing, it will be apparent that Colorado spinners 15 are each characterized by concave surfaces 25 and convex surfaces 26, to achieve a rotating action as the lure is retrieved. The rotating, "surfboarding" and oscillating functions are also made possible by this design. As heretofore noted, spinners 15 are also able to move in many varied relationships with respect to each other due to the design of triangle swivel 11, in that both spinners are at liberty to rotate 360 degrees together on the swivel leg 13 carried by spinner eye 10, in addition to movement about their own axis of rotation. Furthermore, swivel legs 13 may move laterally to a limited degree, since the legs are somewhat smaller than registering ring apertures 28, as illustrated in FIGS. 4 and 7, thereby permitting an additional movement function.

It will be appreciated due to the particular technique of mounting spinners 15 on triangle swivel 11 that other varied effects may be effected by spinner action than those heretofore set forth while retrieving the lure of this invention to attract game fish. As in the case of conventional spinner baits, the lure of this invention can be utilized effectively by "pumping", or alternatively pulling the lure through the water and allowing it to sink, where the fluttering effect of spinners 15 can be dramatically observed as the lure alternately "swims" and sinks and game fish are attracted to strike. The lure is characterized by versatility in that the design of spinner eye 10 permits ready removal and replacement of triangle swivel 11 by simply removing swivel eye 27 from within spinner eye 10. Accordingly, spinner bait 1 can be used in conventional fashion by simply removing the spinner system by removing triangle swivel 11 from spinner eye 10 and replacing the spinner combination with a single spinner in the manner illustrated in FIG. 5 of the drawing. Likewise, conventional spinner baits, both of the single spinner and tandem spinner design may be quickly and easily converted to the dual spinner arrangement of this invention in the same manner.

It will also be appreciated that the spinner bait of this invention can be used with conventional trailers such as plastic worms, ribbons, pork rind and the like, and is typically equipped with a skirt 5, as in the case of conventional baits.

Having described my invention with the particularity set forth above, what is claimed is:

1. A fishing lure comprising:
 a. a body;
 b. at least one hook carried by said body;
 c. at least one wire harness, one end of which is carried by said body and the opposite end of which is disposed at a distance from said body;
 d. triangle swivel means having a first, second and third seivel leg, each disposed in spaced, rotatable relationship with respect to the other, said first swivel leg carried by said opposite end of said wire harness;
 e. eye means in said wire harness for attaching a fishing line; and
 f. a first spinner carried by said second swivel leg of said triangle swivel means and a second spinner carried by said third swivel leg of said triangle swivel means, said first spinner and said second spinner disposed to move when said lure is pulled through the water.

2. The fishing lure of claim 1 wherein said body is formed of lead and said one end of said wire harness and the shank of said hook are embedded in said body.

3. The fishing lure of claim 1 wherein said eye means is a loop formed in said wire harness intermediate said body and said triangle swivel means.

4. The fishing lure of claim 1 further comprising coupling means positioned between said first spinner and said second swivel leg of said triangle swivel means to extend the distance between said first spinner and said second swivel leg of said triangle swivel means.

5. The fishing lure of claim 1 wherein:
 a. said body is formed of lead and said one end of said wire harness and the shank of said hook are embedded in said body; and
 b. said eye means is a loop formed in said wire harness intermediate said body and said triangle swivel means, and further comprising coupling means positioned between said first spinner and said second swivel leg of said triangle swivel means to extend the distance between said first spinner and said second swivel leg of said triangle swivel means.

6. The fishing lure of claim 1 wherein a first portion of said wire harness between said body and said eye means is disposed upwardly at a first preselected angle with respect to the longitudinal axis of said body, and a second portion of said wire harness between said eye means and said triangle swivel means is disposed rearwardly and above said body at a second preselected angle with respect to said first portion of said wire harness.

7. The fishing lure of claim 1 wherein said first spinner and said second spinner are each of substantially identical design and size, or are each of substantially identical design and different size.

8. The fishing lure of claim 1 wherein said first spinner and said second spinner are each of different design.

9. The fishing lure of claim 7 further comprising coupling means positioned between said first spinner and said second swivel leg of said triangle swivel means to extend the distance between said first spinner and said second swivel leg of said triangle swivel means.

10. The fishing lure of claim 8 further comprising coupling means positioned between said first spinner and said second swivel leg of said triangle swivel means to extend the distance between said first spinner and said second swivel leg of said triangle swivel means.

11. The fishing lure of claim 1 wherein:
 a. said body is formed of lead and said one end of said wire harness and the shank of said hook are embedded in said body;
 b. said eye means is a loop formed in said wire harness intermediate said body and said triangle swivel means;
 c. a first portion of said wire harness between said body and said eye means is disposed upwardly at a first preselected angle with respect to the longitudinal axis of said body, and a second portion of said wire harness between said eye means and said triangle swivel means is disposed rearwardly and above said body at a second preselected angle with respect to said first portion of said wire harness; and
 d. said first spinner and said second spinner are each of substantially identical design and size, or are each of substantially identical design and different size.

12. The fishing lure of claim 1 wherein;
 a. said body is formed of lead and said one end of said wire harness and the shank of said hook are embedded in said body;
 b. said eye means is a loop formed in said wire harness intermediate said body and said triangle swivel means;
 c. a first portion of said wire harness between said body and said eye means is disposed upwardly at a first preselected angle with respect to the longitudinal axis of said body, and a second portion of said wire harness between said eye means and said triangle swivel means is disposed rearwardly and above said body at a second preselected angle with respect to said first portion of said wire harness; and
 d. said first spinner and said second spinner are each of different design.

13. The fishing lure of claim 1 wherein:
 a. said body is formed of lead and said one end of said wire harness and the shank of said hook are embedded in said body;
 b. said eye means is a loop formed in said wire harness intermediate said body and said triangle swivel means;
 c. a first portion of said wire harness between said body and said eye means is disposed upwardly at a first preselected angle with respect to the longitudinal axis of said body, and a second portion of said wire harness between said eye means and said triangle swivel means is disposed rearwardly and above said body at a second preselected angle with respect to said first portion of said wire harness; and d. said first spinner and said second spinner are each of substantially identical design and size, or are each of substantially identical design and different size, and further comprising coupling means positioned between said first spinner and said second swivel leg of said triangle swivel means to extend the distance between said first spinner and said second swivel leg of said triangle swivel means.

14. The fishing lure of claim 1 wherein:
a. said body is formed of lead and said one end of said wire harness and the shank of said hook are embedded in said body;
b. said eye means is a loop formed in said wire harness intermediate said body and said triangle swivel means;
c. a first portion of said wire harness between said body and said eye means is disposed upwardly at a first preselected angle with respect to the longitudinal axis of said body, and a second portion of said wire harness between said eye means and said triangle swivel means is disposed rearwardly and above said body at a second preselected angle with respect to said first portion of said wire harness; and
d. said first spinner and said second spinner are each of different design, and further comprising coupling means positioned between said first spinner and said second swivel leg of said triangle swivel means to extend the distance between said first spinner and said second swivel leg of said triangle swivel means.

15. The fishing lure of claim 1 wherein said swivel means comprises a ring, a first swivel leg secured to the ring against circumferential movement on the ring but free to rotate about its own axis and having means for removably fastening it to the harness, and second and third swivel legs each secured to the ring against circumferential movement but free to rotate about its own axis at points on the ring circumferentially spaced from the first leg and from each other, and a spinner attached to each of said second and third of swivel legs.

16. The fishing lure of claim 1 further comprising a third spinner carried in tandem position on said wire harness between said eye means and said triangle swivel means.

* * * * *